UNITED STATES PATENT OFFICE 2,481,843

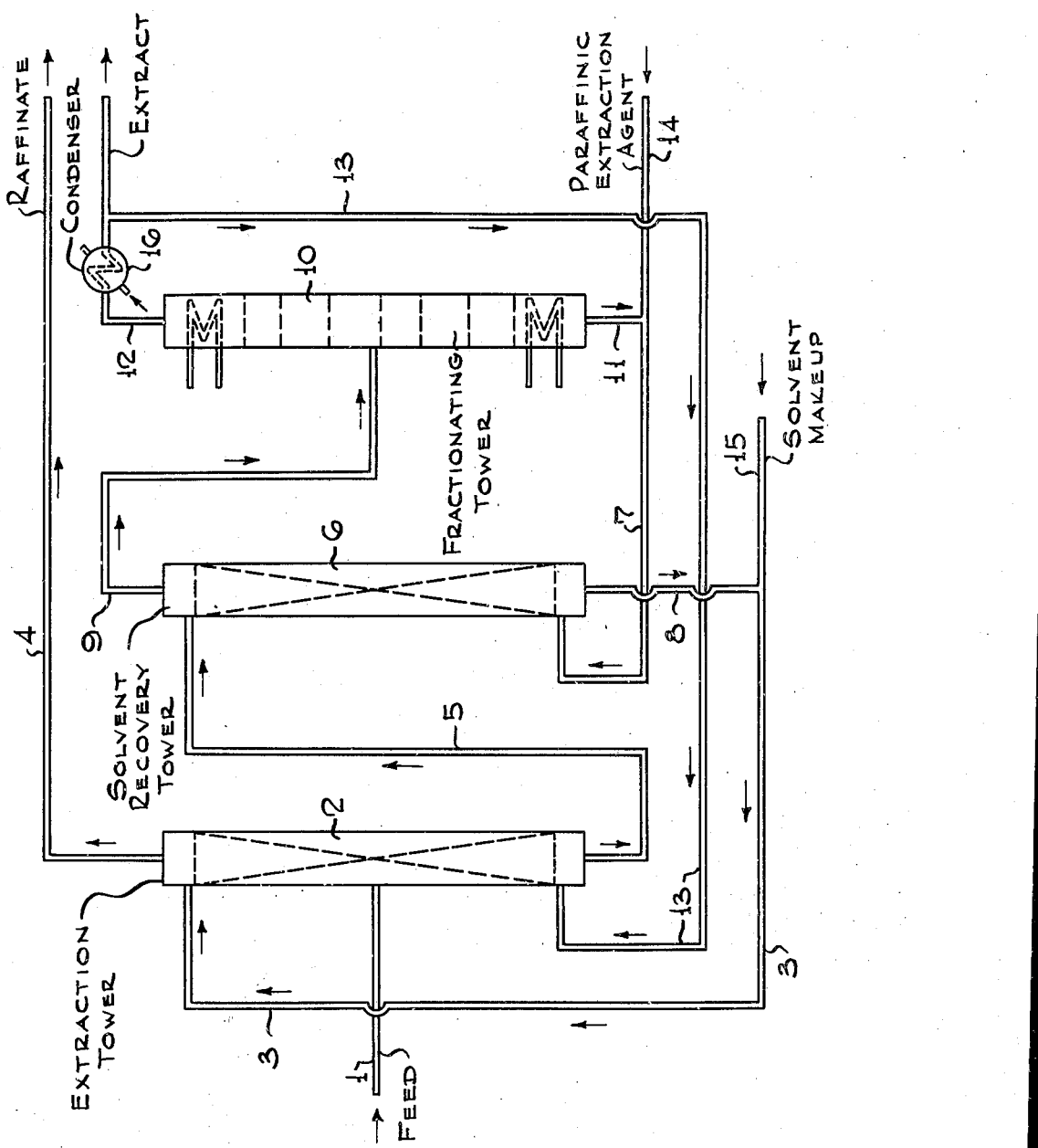

EXTRACTION OF AROMATICS WITH ALUMINUM HALIDE-AROMATIC COMPLEXES

Philetus H. Holt, II, Summit, and Nicholas Menshih, Cranford, N. J., assignors to Standard Oil Development Company, a corporation of Delaware Application January 2, 1947, Serial No. 719,754

7 Claims. (Cl. 196—14.25)

The present invention is concerned with the separation of oils into their relatively more aromatic constituents and into their relatively more paraffinic and naphthenic constituents. The invention is more particularly concerned with the treatment of petroleum oils, especially petroleum oils boiling in the naphtha, kerosene and gas oil range, with a solvent selected from a new class of solvents which have been found to give particularly desirable results. The solvents of the present invention are selected from the class of aluminum halide-aromatic hydrocarbon complexes.

It is known in the art to treat oils, particularly petroleum oils, with various selective solvents in order to segregate the oils into their relatively more paraffinic or hydrogen rich constituents and into their relatively more aromatic or hydrogen poor constituents. In these processes, solvents of the class which have a preferential selectivity for the more aromatic type compounds are usually employed, as for example, phenol, furfural, sulfur dioxide, cresol, nitrobenzene, aniline, beta beta dichlor diethyl ether, and the like. Solvent mixtures of these solvents are employed as well as other substances having the ability to modify the selectivity and solvent power of the particular solvent or solvent mixture. Substances of this type are water, liquefied normally gaseous hydrocarbons such as propane and butane, as well as alcohols and glycols. The oil and the solvent, or solvent mixture, employed are contacted by various methods, as for example, by a batch or by a semi-batch operation. However, the usual method employed is a countercurrent tower treating operation. In this operation, the lighter phase, usually the oil, is introduced at the lower or middle section of a countercurrent treating tower. The heavier phase, usually the solvent, is introduced into the upper part of the countercurrent solvent treating tower. The respective phases flow countercurrently under conditions in which complete contact between the respective phases is secured. This is usually accomplished by suitable distributing and contacting means. Temperature and pressure conditions are maintained on the system adapted to secure the formation of a solvent-rich or extract phase and the formation of a relatively solvent-poor, or raffinate phase. The respective phases are removed from the tower and the solvent separated by any suitable means, such as by distillation, washing, and the like. For commercial solvent treating processes it has been difficult to find a solvent which is entirely suitable in all respects. An ideal solvent is one which will make a clear separation between the aromatic and the paraffinic constituents of the oil and which will also extract substantially the entire quantity of aromatic constituents present. It is also desirable to have the solvent exhibit this preferential selectivity at relatively low temperatures in order to reduce operating difficulties and expenses. Furthermore, it is desirable that the selective solvent be readily and economically removable from the extract and raffinate phases. The selective solvent is usually separated from the raffinate and extract phases by re-extracting said phases with a secondary solvent or by distillation. If distillation be employed to separate the solvent from the oil, it is necessary that a sufficient difference exist with respect to the various boiling points. Solvent recovery from the respective phases, particularly from the extract phase, will be greatly facilitated provided the particular solvent employed is completely miscible with the relatively more aromatic fraction at operating temperature, which temperature should not be excessively above atmospheric temperatures due to heat economies, and providing the solvent tends toward immiscibility with the extract at temperature not substantially below atmospheric temperatures.

We have now discovered a class of solvents which possess these desirable characteristics and which are therefore particularly desirable in the commercial solvent treatment of petroleum oils. The solvents of our invention are selected from the class of substances commonly designated as aluminum halide-aromatic hydrocarbon complexes. Examples of our particular class of solvents are aluminum chloride-benzene, aluminum chloride-toluene, aluminum chloride-xylenes, aluminum chloride-trimethylbenzenes, etc. Although our examples of the use of this solvent will be concerned with the aluminum chloride-toluene complex, it is to be understood that the invention is not limited thereto and that any aluminum halide-aromatic hydrocarbon complex is as completely operable as the aluminum chloride-toluene complex.

The following outline may be followed in the preparation of such a complex:

$Al_2Cl_6$-toluene complex is prepared in the following manner: powdered $AlCl_3$ is agitated in an excess of toluene at approximately 150 to 200° F., while a promoter such as ethyl chloride or HCl saturated with $H_2O$ vapor is slowly bubbled through the mixture. This operation is continued until all, or essentially all, solid AlCl₃ disappears and is replaced with a liquid layer of the complex. The reaction generally takes about 4–6 hours. After the reaction is complete, the complex may be separated from supernatant toluene, and prepared for further use by extraction with a paraffin.

Our invention may be stated briefly as follows:

Aluminum chloride forms a complex with toluene in the proportion of $Al_2Cl_6 \cdot 1C_7H_8$. In other words, this complex is a complex of two aluminum chloride molecules with one molecule of toluene. Now this complex is capable of taking on or absorbing additional toluene until it forms a saturated complex with the composition $Al_2Cl_6 \cdot 6C_7H_8$. We have found that a reversible reaction of aluminum chloride with toluene and with aromatics in general can therefore be employed as the means of recovering the aromatics from their mixtures with other hydrocarbons. In the specific application to the recovery of toluene, for example, from a virgin naphtha, the reaction of aluminum chloride with an excess of toluene results in the formation of the saturated complex $Al_2Cl_6 \cdot 6C_7H_8$. This saturated complex can then be dearomatized to as low as a 1 to 1 mol ratio toluene/$Al_2Cl_6$, and the resulting dearomatized complex, having great affinity toward toluene can be employed in recovering additional amounts of the aromatic from the feed. Theoretically, this cycle can be repeated indefinitely. The dearomatization, or the regeneration of the solvent can be accomplished either by distillation, preferably under reduced pressure, or by extracting the excess toluene with a paraffinic solvent of different boiling range from the toluene which can then be separated from the toluene by distillation. We have found the latter method of regeneration to be considerably more advantageous since toluene is disproportionated to an appreciable extent when the complex is decomposed by heat.

*Nature of solvent complex composition*

It has been suggested that the saturated $Al_2Cl_6$-toluene complex has the following structure:

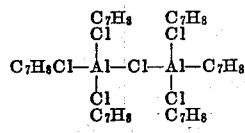

The following cycle of reactions, using aluminum chloride-toluene complex as an example, illustrate the principle involved in the formation of the complex and its function in the solvent process:

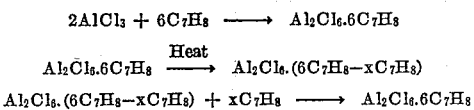

The cycle illustrated by the last two equations can be repeated indefinitely in the extraction of toluene or other aromatics, regeneration of the solvent by partial dearomatization, and recycling the regenerated solvent back to the reaction zone. Good recoveries of aromatics can be obtained in the process. The products are exceptionally pure. The following example is typical of the results obtained when extracting toluene from heptane-toluene blends:

*Extraction of toluene from a 50 mol percent blend in N-heptane with a complex dearomatized to 1.5/1 toluene to $Al_2Cl_6$ mol ratio at 70° F., atmos. pressure, and 1 hr. contact time*

| | | | | |
|---|---|---|---|---|
| Mol Per Cent Toluene in Feed | 50 | | | |
| Mols Toluene in Feed | 0.21 | | | |
| Original Complex: | | | | |
| Toluene/$Al_2Cl_6$ Mol Ratio | 1.5 | | | |
| Mols Complex | 0.49 | 0.37 | 0.25 | 0.25 |
| Mols Toluene Required to Form Saturated Complex ($Al_2Cl_6$–$6C_7H_8$) | 2.21 | 1.67 | 1.13 | 1.13 |
| Product: | | | | |
| Final Complex, Toluene/$Al_2Cl_6$ Ratio | 1.93 | 2.08 | 2.28 | 2.28 |
| Toluene Extracted from Feed, Mols | 0.21 | 0.21 | 0.20 | 0.20 |
| Toluene Recovery from Feed, Mol Per Cent | 100 | 100 | 95 | 95 |
| Toluene Purity, Per Cent | 95 | 95 | 95 | 95 |

In the course of our experimental investigation of this process we have discovered that the composition of the complex and therefore its solvent capacity, is a direct function of the concentration of aromatic hydrocarbon material in equilibrium with it. The following data illustrate the effect of the composition of the hydrocarbon material, i. e., the raffinate, on the composition of the complex in equilibrium with it.

*Studies on the equilibrium between $Al_2Cl_6$-toluene complex and various blends of toluene and heptane; runs made at 70° F. and atmos. pressure, 10 min. contact time*

| Composition of Original Complex | $Al_2Cl_6$—$6C_7H_8$ | | | | |
|---|---|---|---|---|---|
| Wt. of Complex Employed | 40 gms. | | | | |
| Mols Complex Employed | 0.049 | | | | |
| Vol. of Solvent Employed | 200 cc. | | | | |
| Vol. Per Cent Heptane in Solvent | 100 | 79.0 | 59.5 | 40.0 | 20.9 | 0 |
| Vol. Per Cent Toluene in Solvent | 0 | 21.0 | 40.5 | 60.0 | 79.1 | 100 |
| Mols Toluene Ext'd from Complex | 0.209 | 0.203 | 0.191 | 0.171 | 0.147 | 0 |
| Vol. Per Cent Heptane in Resulting Raffinate | 90 | 71.3 | 54.0 | 36.7 | 19.4 | ---- |
| Toluene/$Al_2Cl_6$ Mol Ratio in the Resulting Complex | 1.72 | 1.84 | 2.08 | 2.51 | 3.01 | 6.0 |

The fact that an equilibrium is established between the complex and raffinate points to the feasibility of countercurrent operation of the extraction process. Batch or concurrent operation is inadvisable since a complex of any initial saturation would come to an equilibrium with the raffinate, and very low recoveries would be obtained unless prohibitively large amounts of the solvent were employed. The countercurrent extraction can be conveniently carried out in a packed column, a series of agitators and settlers, or any other commonly employed equipment for extraction.

It has also been determined by experimental work that the complex combined with the extracted aromatics, also contains traces of other hydrocarbons dissolved from the feed. These must be eliminated from the final product in order to obtain pure aromatics. An advantageous and simple method of accomplishing this is by countercurrently washing the extract in pure aromatics. This does not impose additional load on the solvent capacity since the solvent in equilibrium with the entering feed does not reach saturation unless the washing step is employed.

We prefer to operate the extraction and washing towers at atmospheric to 50 pounds psig. and at temperatures from about 50° F. to about 250° F. Complex regeneration, as will be explained more fully below, if carried out by distillation, is conducted at approximately 0.25 atmosphere absolute. If countercurrent washing with a paraffin hydrocarbon is used for complex regeneration, this step is carried out at the same conditions as the extraction.

Extraction system process

A suitable commercial plant for the recovery of toluene from a virgin naphtha feed stock with our $Al_2Cl_6$-toluene complex would consist of two packed extraction towers and a still for separating a paraffinic naphtha which is used in the regeneration of the complex from the product toluene. The total heat requirement would be that necessary to vaporize the hydrocarbon extract phase in an amount approximately twice that of the feed.

The process of our invention may be readily understood by reference to the attached drawing, illustrating one modification of the same:

Dry and olefin-free feed containing 20 weight per cent toluene through line 1 enters the middle of the extraction tower 2, in this case containing five extraction stages, where it is contacted with the downflowing solvent complex, entering through line 3. The raffinate, which is solvent-free and contains 2 weight percent toluene, is released at the top of the tower through line 4. The extract phase is released through line 5 to the top of solvent recovery tower 6 where the solvent is regenerated by countercurrent washing with a paraffinic extraction agent such as kerosene which enters the bottom of the solvent recovery tower through line 7 from line 14. The regenerated solvent is removed from the bottom of the tower through line 8 and is returned to the extraction tower through line 3. Make-up solvent is added through line 15. The solution of solvent-free extract in kerosene is taken overhead from tower 6 through line 9 and emptied into fractionator 10 in which it is distilled in order to recover kerosene as bottoms through line 11 and the final toluene extract is taken overhead through line 12, condensed in condenser 16 and led to a storage vessel not shown. A portion of the toluene overhead is withdrawn through line 13 and returned to the extraction tower as reflux to wash traces of other hydrocarbons dissolved from the feed from the extract.

For the extraction of 100 lbs. feed, in order to produce 18.75 lbs. of 98 weight percent pure toluene and 81.25 lbs. of raffinate containing 2 weight percent toluene, a solvent circulation of 300 lbs. is necessary under the conditions described in the flow diagram. This represents 91.8 weight percent toluene recovery and 1.65/1 solvent/oil volume ratio. A considerable amount of reflux must be returned to the extract end of the system in order to obtain this product purity with 2½ theoretical stages below the feed inlet point. In the stripping and enriching sections, 201 lbs. of reflux phase must be returned. Solvent regeneration is conducted in a tower with five theoretical stages. With this number of stages, the extract phase must be washed with 520 lbs. of kerosene in order to recover 99 weight percent of the extracted toluene.

The extraction is preferably carried out in a countercurrent manner at atmospheric pressure and preferably at temperatures in a vicinity of room temperature, that is, approximately 70° F.

Aside from the low stage and solvent requirements, the aluminum halide-aromatic complex solvent system requires a minimum temperature control, no refrigeration and no pressure equipment.

Regeneration of spent solvent complex

It has been found that the $Al_2Cl_6$-toluene complex can be dearomatized, that is, regenerated to 1:1 toluene $Al_2Cl_6$ mol ratio either by a countercurrent extraction with a paraffinic solvent or by distillation under reduced pressure. The regenerated complex can then be saturated again with additional amounts of toluene. The regeneration, by means of extraction, is more advantageous in spite of the fact that it introduces an additional step into the solvent recovery process, that is, the separation by distillation of the final toluene product and the extracting medium. This is due to the fact that the decomposition of the product complex with heat results in a partial disproportionation of toluene. The extent of this disproportionation is illustrated in the following summary of data obtained when decomposing the complex under 20″ of vacuum and temperatures as high as 165–175° F.

Regeneration of $Al_2Cl_6.6C_7H_8$ Complex

| Method of Regeneration HC Phase Composition | Distillation | Extraction with $nC_7H_{16}$* |
|---|---|---|
| Benzene, Vol. percent | 2.5 | 0 |
| Toluene, Vol. percent | 75.3 | 100 |
| Higher Aromatics, Vol. percent | 22.2 | 0 |

*Heptane free basis.

It would be expected that the use of distillation for the regeneration of complexes between $Al_2Cl_6$ and $C_{8+}$ aromatics would result in a still higher degree of disproportionation or isomerization.

Our preferred solvent regeneration process comprises the extraction of the saturated or partially saturated complex with a paraffinic or naphthenic hydrocarbon boiling at a temperature different from the aromatic hydrocarbon to be recovered from the complex.

Again using aluminum chloride-toluene as the complex, we have found that the extent of saturation of the complex with toluene is a function of toluene concentration in the hydrocarbon material in equilibrium with the complex. This is illustrated by the following data which were obtained in a series of experiments in which the saturated $Al_2Cl_6.6C_7H_8$ complex was agitated at room temperature and atmospheric pressure with toluene heptane blends of varying compositions:

*Regeneration of $Al_2Cl_6$-toluene complex by extraction with heptane and blends of heptane in toluene operation at 70° F., atmospheric pressure, and 10 min. contact time.*

| | | | | | | |
|---|---|---|---|---|---|---|
| Wt. of Complex Employed | 40 gms. of $Al_2Cl_6$-$6C_7H_8$ | | | | | |
| Mols of Complex | 0.049 | | | | | |
| Vol. of Solvent | 200 cc. | | | | | |
| Vol. Percent Heptane in Solvent | 100 | 79.0 | 59.5 | 40.0 | 20.9 | 0 |
| Vol. Percent Toluene in Solvent | 0 | 21.0 | 40.5 | 60.0 | 79.1 | 100 |
| Mols Toluene Extracted from Complex | 0.209 | 0.203 | 0.191 | 0.171 | 0.147 | 0 |
| Toluene/$Al_2Cl_6$ Mol Ratio in Regenerated Complex | 1.72 | 1.84 | 2.08 | 2.51 | 3.01 | 6.0 |

A complex of any desired composition can be obtained by the method discovered by us merely by adjusting the toluene content of the extraction medium. The data cited illustrate the use of heptane as the extraction medium. Other paraffins, however, are equally good. Commercially, it may be preferable to use hexane or even pentane which can be easily separated from the extracted toluene by distillation.

The extracting agent employed will produce a variation in the operation of fractionator 10. With light paraffin hydrocarbon extracting agents such as pentane, hexane and heptane, toluene is recovered as bottoms in fractionator 10 while the light hydrocarbons are recovered overhead. With heavier paraffin hydrocarbons, e. g., kerosene, fractionator 10 operates as described in the drawing with the toluene taken overhead and the kerosene removed as bottoms.

It is to be noted that a feedstock from which aromatic hydrocarbons are to be extracted with our aluminum halide-aromatic hydrocarbon complex may contain one or more aromatic hydrocarbons, e. g., benzene, toluene, xylene isomers, trimethylbenzenes, etc. In this event, the aluminum halide-aromatic hydrocarbon complex will form with one or more of these materials producing a mixed extract containing materials such as aluminum halide-toluene-benzene, or aluminum halide-toluene-trimethylbenzene in which part of the aluminum halides complex saturation is satisfied by toluene and part by the other aromatic hydrocarbons; e. g., $Al_2Cl_6$-2 toluene-4 xylene.

Although the invention has been described chiefly by explaining the solvent process using aluminum chloride-toluene as the solvent, no intention is made to limit the invention thereto, and it is to be understood that the process is completely operable employing other aluminum halides with other aromatic hydrocarbons or mixed aromatic hydrocarbons.

Having thus described the invention, what is claimed is:

1. A continuous process for extracting aromatic hydrocarbons from hydrocarbon mixtures of aromatic and non-aromatic hydrocarbons which comprises subjecting said mixtures to contact in an extraction zone with an aluminum halide-aromatic hydrocarbon complex containing two mols of aluminum halide and at least one mol of aromatic hydrocarbon, removing from the extraction zone an aluminum halide-aromatic hydrocarbon complex of increased aromatic hydrocarbon content containing two mols of aluminum halide and up to six mols of aromatic hydrocarbon, passing the complex of increased aromatic content to a regeneration zone and decomposing the complex of increased aromatic content in the regeneration zone to recover aromatic hydrocarbons therefrom and regenerate the aluminum halide-aromatic hydrocarbon complex containing two mols of aluminum halide and at least one mol of aromatic hydrocarbon.

2. A method according to claim 1 in which the aluminum halide is aluminum chloride and in which the aromatic hydrocarbon is toluene.

3. A method according to claim 1 in which the complex of increased aromatic hydrocarbon content is regenerated by distillation under reduced pressure.

4. A method according to claim 1 in which the complex of increased aromatic hydrocarbon content is regenerated by extraction with a non-aromatic hydrocarbon boiling at a temperature different from the aromatic hydrocarbon being extracted.

5. A process according to claim 1 in which the solvent extraction operation is carried out countercurrently.

6. A process according to claim 1 in which the extraction is carried out at atmospheric pressure and temperatures in the neighborhood of room temperature.

7. A process according to claim 1 in which said solvent is recovered from the respective phases by distillation under reduced pressure.

PHILETUS H. HOLT, II.
NICHOLAS MENSHIH.

REFERENCES CITED

The following references are of record in the file of this patent:

UNITED STATES PATENTS

| Number | Name | Date |
|---|---|---|
| 2,079,885 | Voorhees | May 11, 1937 |
| 2,081,720 | Van Dijck | May 25, 1937 |
| 2,114,524 | Egli | Apr. 19, 1938 |
| 2,138,832 | Brown et al. | Dec. 6, 1938 |
| 2,257,086 | Atwell | Sept. 30, 1941 |
| 2,260,279 | D'Ouville et al. | Oct. 21, 1941 |
| 2,382,445 | Ross et al. | Aug. 14, 1945 |